Figure 1:
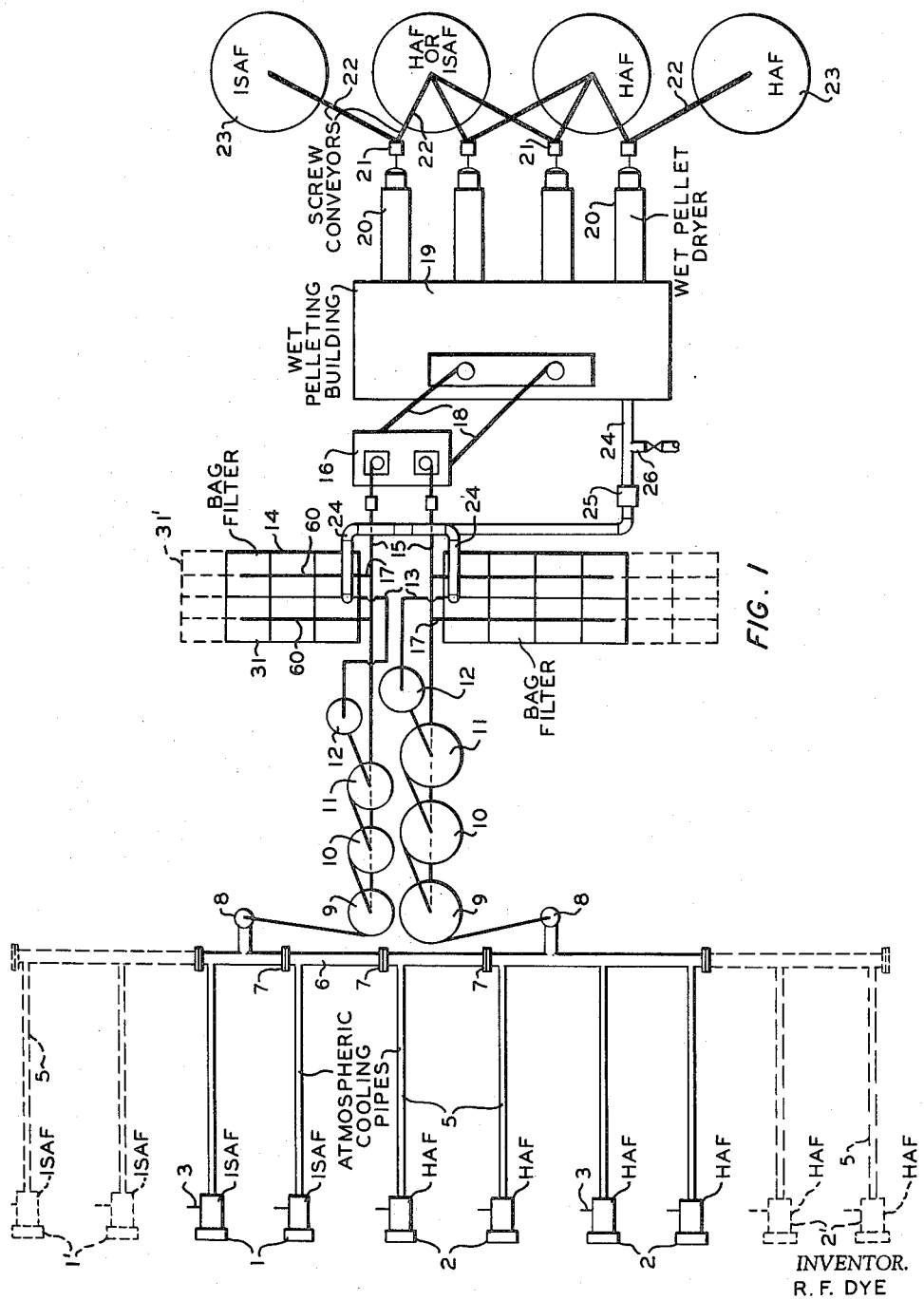

INVENTOR.
R. F. DYE
BY Hudson & Young
ATTORNEYS

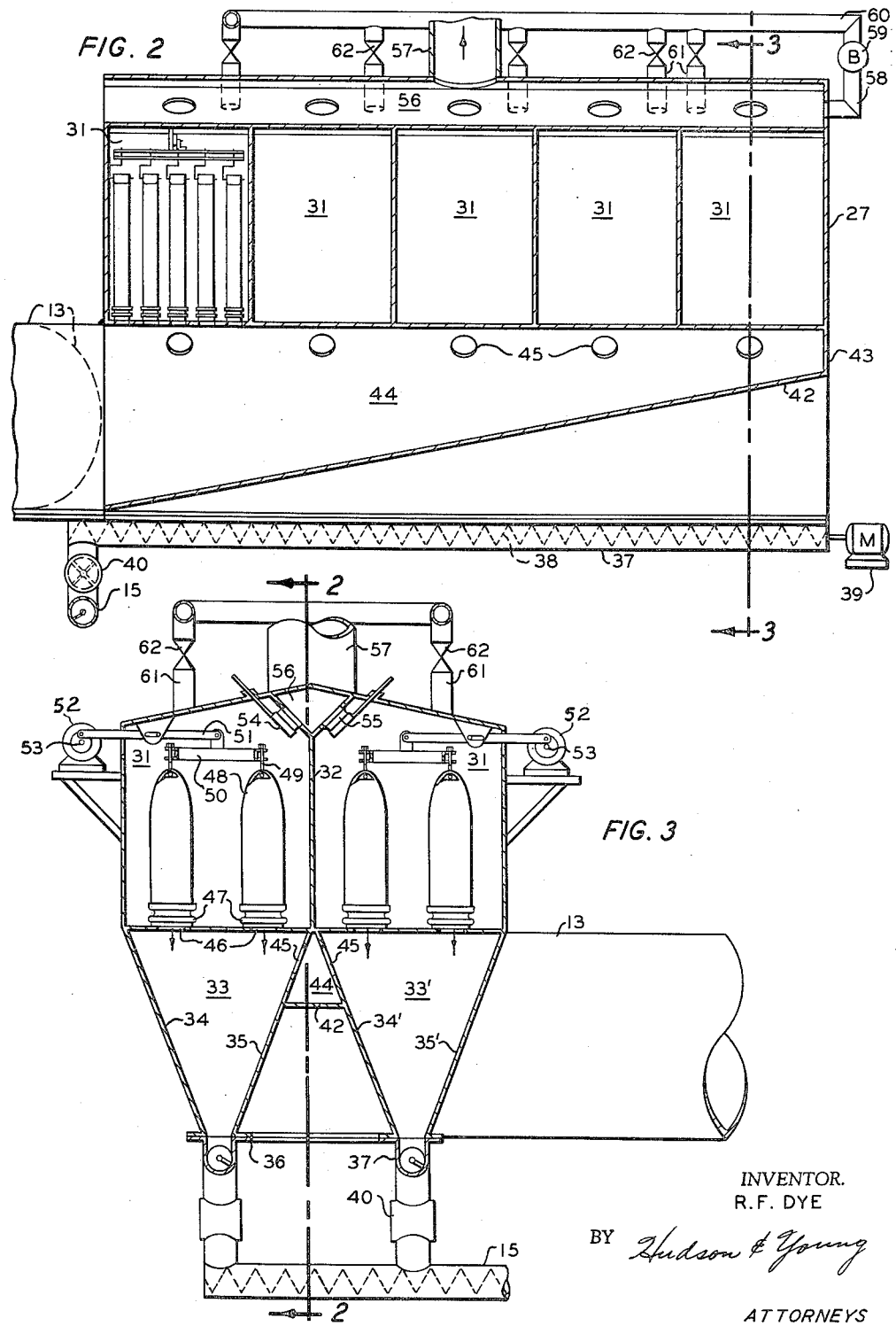

United States Patent Office 3,024,093
Patented Mar. 6, 1962

3,024,093
CARBON BLACK PLANT
Robert F. Dye, Bartlesville, Okla., assignor to Phillips Petroleum Company, a corporation of Delaware
Filed Sept. 18, 1959, Ser. No. 840,878
3 Claims. (Cl. 23—259.5)

This invention relates to an arrangement of apparatus in a carbon black plant.

In the carbon black producing industry various types of carbon black for various specific uses are produced by the pyrolytic conversion of hydrocarbons, in either gaseous or liquid form, to carbon black and by-product gases. To illustrate, one type of carbon black reactor comprises a combustion chamber of greater diameter than length contiguous to and coaxial with a downstream reaction chamber of greater length than diameter and of lesser diameter than the combustion chamber. Natural gas or other fuel gas is injected in admixture with oxygen or air through a plurality of burners tangentially into the combustion chamber so as to burn the fuel which forms a spiralling layer of hot combustion gas passing through the reaction chamber. The oil or other hydrocarbon to be pyrolytically cracked or converted to carbon black is injected axially through the combustion chamber into the reaction chamber, wherein the same is heated and cracked to form carbon and by-product gases. Water is injected into the effluent gaseous stream from the reactor at a suitable point along the downstream end of the elongated reaction chamber and the position of the quench along the reaction chamber is changeable in order to control the type of black produced. A single carbon black plant containing a battery of these reactors is therefore adapted to produce various types of black by adjusting the quench point and reaction conditions in the reactors.

As demand for the different types of black changes, it is desirable to change the proportion of production of the different types of black in any given plant, but because of the rather fixed nature of the plant equipment, considerable rearrangement of equipment is necessary in order to do this.

In recovering entrained or suspended black from the effluent smoke from the cyclone separators in a carbon black plant, it is conventional to pass the smoke through a bag filter unit of suitable size for recovering the black particles. As more furnaces are converted to the production of a specific type of black it is necessary to expand the capacity of the bag filter unit to take care of the additional production. Heretofore, because the feed to the filter unit was introduced at one end from a conveyor line and the effluent black from the filter was passed to the opposite end of the unit to a black pick-up conveyor line, it was necessary to tear up and relocate at least one of the conveyor lines in order to expand the bag filter unit. This revision was costly and time consuming, thereby throwing an undesirable economic burden on the production of carbon black to meet the demands of industry. This invention provides an economic solution to the foregoing problems.

Accordingly, it is an object of the invention to provide an improved arrangement of equipment in a carbon black producing plant. Another object is to provide a flexible arrangement of carbon black producing equipment which can be shifted from production of one type of black to another type with a minimum change in equipment relocation and in a minimum of time. A further object is to provide a readily expansible arrangement of equipment to take care of variations in demand for various types of carbon black. It is also an object of the invention to provide an arrangement of plant equipment for producing carbon black which occupies a minimum amount of space. Other objects of the invention will become apparent upon consideration of the accompanying disclosure.

One embodiment of the invention comprises an arrangement of carbon black reactors for producing at least two types of carbon black wherein the reactors in two series of reactors are spaced apart in line and parallel, with parallel cooling pipes extending from the effluent ends of the reactors to a common collection header. This collection header is made in sections which are bolted together by means of flanges to form a continuous, in-line header. The flanges are positioned, one at a point intermediate adjacent reactors producing different kinds of black and two on opposite sides of these reactors so that a blind disk inserted between the flanges at any one of these positions changes the intermediate reactor from one series of reactors to the other with respect to the collecting header. The outside ends of the headers are flanged and blinded by means of a disk bolted to the flange to provide for extension of the header to accommodate additional reactors added to either series of reactors. In this manner each series of reactors feeds smoke containing the produced carbon black into a separate collecting header and this collecting header can be expanded in either direction to include one of the reactors in the adjacent series and to add additional reactors adjacent the outside ends of the header, thereby rendering the plant arrangement highly flexible and adaptable to changing production requirements.

In accordance with another embodiment of the invention, effluent carbon black collecting and conveying systems for the two series of reactors are closely spaced in parallel arrangement with separate bag filter units adjacent the conveyor systems and on opposite sides thereof, each bag filter unit being adapted and arranged for separating carbon black from the gaseous suspension thereof passing through the smoke conveyor immediately in front of the bag filter unit and for dispensing the collected carbon black to the carbon black pick-up conveyor passing along the front of the unit. In this arrangement the bag filter units may be readily expanded in a direction away from the conveyor lines in front of the units without disrupting the arrangement of the smoke and carbon black conveyor lines.

A more complete understanding of the invention may be obtained from a consideration of the accompanying drawings of which FIGURE 1 is a schematic plan view of a plan arrangement in accordance with the invention; FIGURE 2 is an elevation in partial cross-section taken on the line 2—2 of FIGURE 3 showing half of a bag filter unit having 10 different filtering compartments; and FIGURE 3 is a transverse cross-section of the bag filter unit taken on the line 3—3 of FIGURE 2.

Referring to FIGURE 1, a series of reactors 1 adapted for producing intermediate super-abrasion furnace black (ISAF) are positioned parallel and in line with a series of reactors 2 similarly positioned and designed or arranged for producing high abrasion furnace black (HAF). Each series of furnaces is equipped with parallel atmospheric cooling pipes 5 which lead from the effluent ends of the furnaces or reactors to a common collecting header 6. Collecting header 6 is fabricated in segments which are joined by flanges 7, one of which is positioned intermediate adjacent reactors of series 1 and series 2 so that a blinding disk positioned between the flanges at this location separates the header into two segments, one for each series of reactors. The other flanged joints make it possible to include one of the HAF furnaces of series 2 to an ISAF furnace of series 1 or vice versa by proper location of the blinding disk. Of course, the furnaces are readily changed from the production of one type of black to the other by changing the location of the quench point in the furnace, i.e., by moving the quench water line 3, or the injection end thereof, along the length of the furnace. The outside ends of headers 6 are flanged and covered with a disk which is removable to permit the addition of another header segment for additional carbon black furnaces or reactors such as 1' added to series 1 furnaces and 2' added to series 2 furnaces at the opposite end of the headers.

The header segment of each series of reactors is connected by conduit means with a grit separator 8 which removes grit from the effluent smoke and passes the smoke to a series of cyclone separators 9, 10, and 11. A quench tower 12 is positioned immediately downstream of the last cyclone separator and is connected therewith by effluent conduit means. A water quench is injected into each quench tower by means not shown. The quenched effluent smoke from tower 12 is passed through a conduit 13 into the front end of bag filter unit 14. A pick-up conveyor line 15 extends downstream from the bottom or solids outlets of cylones 9, 10, and 11 to micropulverizer and collection cyclone means 16. Carbon black in the smoke stream passing through conveyor line 13 into filter bag unit 14 is recovered therein and delivered by means of conveyors 17 into conveyor line 15 for transfer downstream to the collecting zone 16.

Each battery of cyclones 9, 10, and 11 is a part of the collecting system which feeds black into parallel conveyor lines spaced apart a short distance to facilitate compactness and save space in the plant and also to make it feasible to arrange the bag filters on opposite sides of these lines so that by introducing black to and recovering black from the same end of the filter units in a direction away from the collecting lines is feasible without disrupting or relocating the pick-up conveyor lines and the smoke delivery lines to the filter units.

Filter unit 14 comprises two parallel rows of filtering compartments 31 which extend away from the conveyor lines. One or more additional compartments 31' may be added to each row of compartments 31 without molesting the feed and withdrawal means at the front end of the unit, so that when additional reactors are added to the series of reactors feeding the pick-up system, the additional production of carbon black is readily accommodated by additional compartments 31' added to the filter bag unit.

The carbon black is passed by conduits 18 from collection zone 16 to wet pelleting building 19 which houses conventional wet pelleting apparatus from which the pellets are passed to rotary driers 20. Rotary driers 20 feed the dry pellets into distributing boxes 21 from which they are passed by conveyors 22 to storage tanks 23. Storage tanks 23 are positioned adjacent bagging and transportation facilities not shown. Off gas from the bag filter unit is passed through a conduit system 24 by means of blowers 25 thru wet pelleting building 19 to the wet pellet driers 20. Hot gases in conduit system 24 not required or used in the driers are vented thru line 26.

In FIGURES 2 and 3 there is shown a bag filter assembly, denoted generally by reference numeral 27 which comprises 10 filtering compartments 31 arranged in parallel rows of 5 compartments each. A common vertical partition 32 divides the two rows of filtering compartments. Positioned below each row of filtering compartments are solids receiving hoppers 33 and 33' defined by walls 34, 35, and 34' and 35', respectively, and end walls, not shown, in the shape of a truncated V, each hopper being attached at its inverted base to the lower end of one row of said compartments. Attached to the truncated apex of each hopper by means of a flange 36 is a conveyor trough 37. Screw conveyor 38, driven by motor 39, is positioned within said conveyor trough 37. Conveyor 38 discharges at the front of the unit through rotary valve 40 into conveyor line 15 which conveys the recovered solids to storage, or further treatment. Conveyor line 15 can be either a screw conveyor or a pneumatic conveyor.

Plate 42 is sealingly attached to the wall 34' of hopper 33' and wall 35 of hopper 33. Said plate 42 extends longitudinally of the filter assembly 27 and together with walls 34', 35, and closure member 43 defines an inlet plenum chamber 44 through which gases containing suspended solids from inlet conduit 13 are admitted into the filtering compartments 31. Passageways 45 and passageways 46 provide means for said gases to enter said compartments from said inlet plenum chamber. Positioned within each of said passageways 46 is a suitable conduit 47 adapted to be secured in gas tight communication with a filter bag 48. Conduit 47 can be any type of suitable conduit. Other means of inserting bag 48 into passageway 46 can be employed. One such other means comprises an expandable ring fitted into the lower end of bag 48. In use the lower end of bag 48, having the compressed ring fitted therein, is inserted into passageway 46, and the ring is permitted to expand to form a gas tight connection with said passageway. Filter bags 48 are closed by folding over their upper ends and are suspended by means of hook 49 from shaker channel 50 attached to shaker bar 51 which is driven by an eccentric 53 attached to motor 52. Shaker channel 50 and shaker bar 51 are suitably mounted by means not shown so that said shaker channel can be reciprocated in a direction perpendicular to the plane of the paper in FIGURE 2, by means of eccentric 53.

Filter bags 48 can be woven from any suitable fabric which will withstand the temperature within the unit and filter out the black. Presently preferred types of material for filtering black from the smoke of a carbon black furnace are the polyacrylonitrile synthetic fiber available on the open market under the registered trademark "Orlon," and glass fiber bags.

Slide valves 54 attached to conduit outlets 55 provide means of egress for the clean gases from the compartments into upper plenum chamber 56 from which said gases are passed to conduit system 24 or vented to the atmosphere through stack 57. Conduit 58, blower 59, conduit 60 and conduits 61 having valves 62 therein provide means for compressing a portion of the gases from said plenum chamber 56 and returning same to a selected compartment 31 during shaking operations (described hereinafter) so as to increase the pressure on the outside of bags 48 and thereby facilitate discharge of deposited solids from said bags.

In operation, as applied to a carbon black plant, the effluent gases from conduit 13 containing about 5 percent of the carbon black formed in reactors 1 or 2 are introduced into the upstream end of inlet plenum chamber 44. Said gases containing the suspended carbon black are passed through passageways 45 into the upper portion of hoppers 33 and 33' from where they pass through passageways 46 and conduits 47 into the inside of bags 48. Bags 48 retain the suspended solids, allowing the gases to pass therethrough into the filtering compartment 31 surrounding said bags. Clean gases are passed through open slide valves 54 and conduits 55 into plenum chamber 56 and are vented through stack 57 or directed into conduit system 24.

In continuous operation it is necessary, periodically, to discharge collected solids from the inside of bags 48. When this is necessary it is accomplished by first closing the valve 54 on the outlet from the filter compartment containing the bags to be cleaned, thus stopping flow of gases into the compartment. Blower 59 takes suction via conduit 58 on the clean gases in upper chamber 56 and returns the compressed gases via conduits 60 and 61 to the compartment 31 which has been taken out of service. This increases the pressure on the outside of bags 48 and aids in releasing the deposited material from the inside of said bags. Simultaneously with this pressuring operation, bags 48 are shaken by the shaker means previously described. In carbon black manufacture it is generally desirable to shake the bags in each compartment about 15 seconds after each 15 minutes of operation. It will, of course, be understood by those skilled in the art that the duration and frequency of the shaking period will vary with the type of black being filtered and the concentration of the solids suspended in the gases.

A plant is being built in accordance with the arrangement of equipment and apparatus shown in the drawing. This plant is designed to produce ISAF and HAF black with provisions for shifting reactors between the two series from one series to the other. Provision is also made for adding additional reactors to each series at the outside end of each collecting header as shown in the drawing. The collecting lines are disposed in parallel arrangement closely spaced apart with the filter bag units opposite each other on opposite sides of the conveyor lines and with provision for expansion of the filter bag units by adding additional compartments thereto on the ends opposite the inlet or front ends adjacent the conveyor lines. The arrangement shown materially reduces the space requirements of a carbon black plant of the capacity represented and at the same time renders the plant readily expansible with a minimum of cost, labor, and consumption of time.

With four HAF reactors in operation, the black production rate is 100,910 pounds per day and with 2 ISAF reactors operating, the production rate is 43,640 pounds per day. By shifting one of the HAF reactors to production of ISAF, the production rate of this black can be increased to 65,460 pounds per day with corresponding reduction of the amount of HAF black produced. By shifting one of the ISAF reactors to HAF black production, an increase of 25,228 pounds of this black is effected. Similarly the production of HAF black may be increased by 25,228 pounds per day by adding another reactor to the series at the outside end. Similar results may be effected by adding an ISAF reactor on the outside of the series. Addition of reactors to the outside of the series will require additional compartments to the filter bag units.

The filter bag units of the plant comprise one for ISAF black having two rows of compartments of three each and one for the HAF black of two rows of four each. These units are readily expansible in a direction away from the conveyor lines without in any way changing the arrangement of conveyors and conduits in front of or between the units. Each compartment is provided with 396 "Orlon" bags 5½" in diameter by 138" in length so as to provide 5820 square feet of filtering surface in each compartment.

Certain modifications of the invention will become apparent to those skilled in the art and the illustrative details disclosed are not to be construed as imposing unnecessary limitations on the invention.

I claim:

1. In a carbon black plant, a first series of parallel spaced-apart, in-line, water-quenched carbon black reactors convertible from one type of black production to another by changing the quench point therein; a second series of said reactors in line with said first series; parallel effluent smoke lines comprising elongated cooling pipes extending from said reactors; a header pipe extending along the downstream ends of said cooling pipes; a blind flange comprising a removable cut-off disk in said header pipe intermediate the adjacent pipes of the two series, there being flanged joints in said header pipe between the two cooling pipes in each series nearest said blind flange to permit relocating said disk to switch reactors from one series of reactors to another; and an effluent line from each resulting header section.

2. In the carbon black plant of claim 1, a blind flange on one end of said header pipe for attaching an additional length of header pipe to accommodate at least one reactor added to one of said series.

3. In the carbon black plant of claim 1, a blind flange on each outer end of said header pipe for attaching an additional length of header pipe at each said end to accommodate at least one reactor added to each said series.

References Cited in the file of this patent

UNITED STATES PATENTS 2,805,732    Martinez _____ Sept. 10, 1952
2,835,562    Boyer et al. _____ May 20, 1958

OTHER REFERENCES

Drogin et al.: Today's Furnace Blacks, pp. 18, 21, United Carbon Co., Charleston, West Virginia, 1948.